LE ROY B. CARRIS.
RESILIENT WHEEL.
APPLICATION FILED JAN. 20, 1917.
1,261,359.
Patented Apr. 2, 1918.
2 SHEETS—SHEET 1.
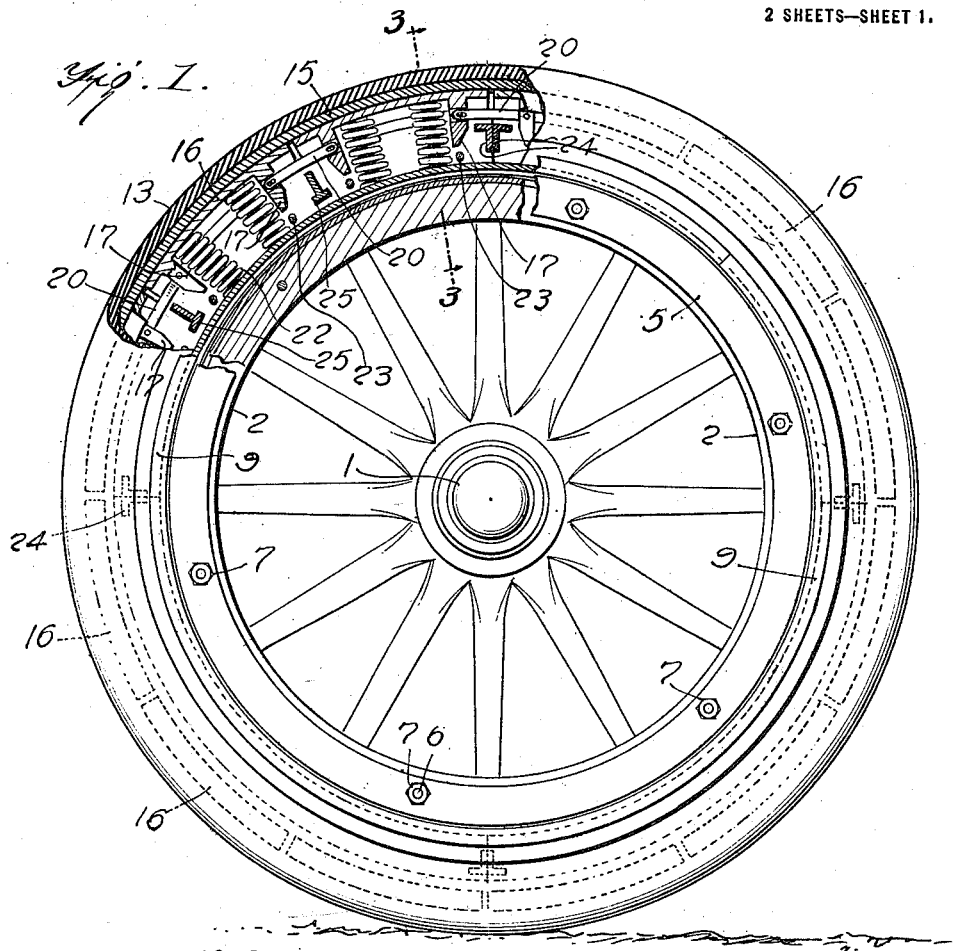
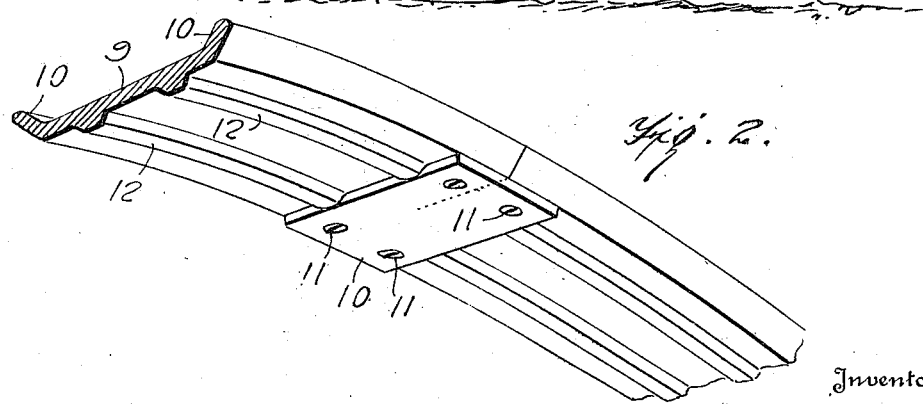
Witnesses
Inventor
LE ROY B. CARRIS,
By
Attorneys LE ROY B. CARRIS.
RESILIENT WHEEL.
APPLICATION FILED JAN. 20, 1917.
1,261,359.
Patented Apr. 2, 1918.
2 SHEETS—SHEET 2.
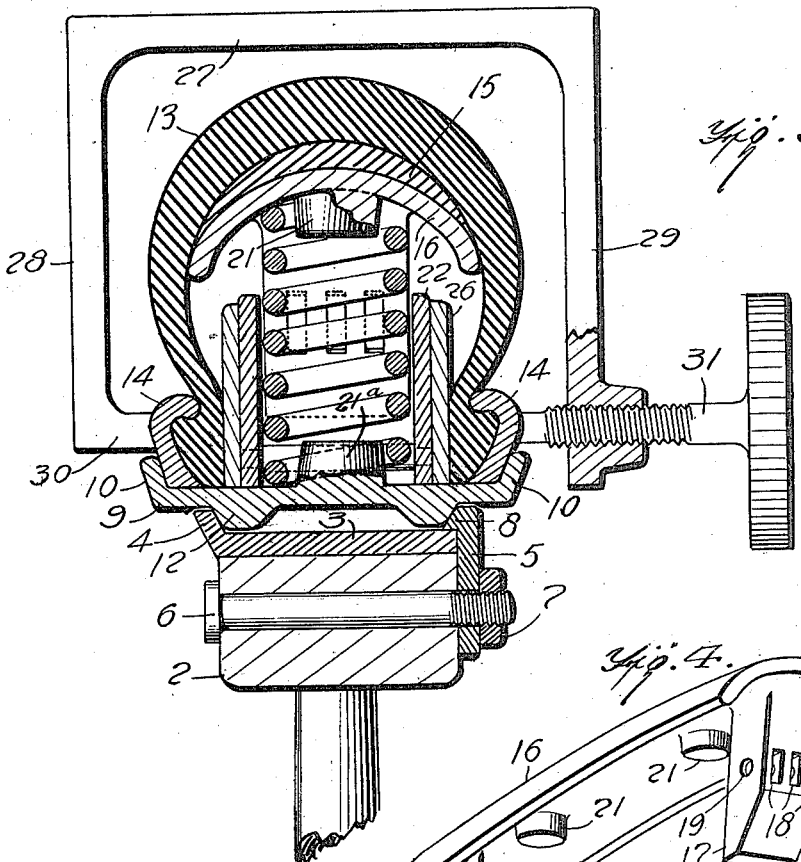
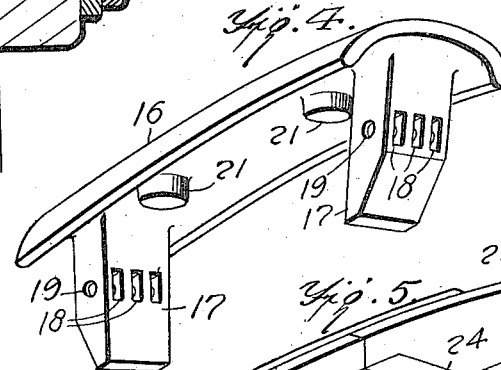
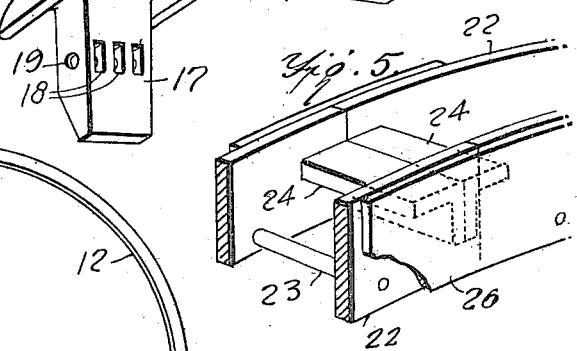
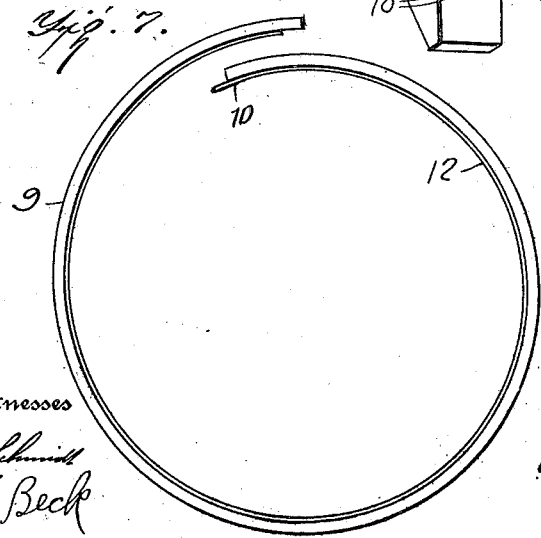
Inventor
LeRoy B. Carris

UNITED STATES PATENT OFFICE.

LE ROY B. CARRIS, OF CLAY COUNTY, IOWA.

RESILIENT WHEEL.

1,261,359.  Specification of Letters Patent.  Patented Apr. 2, 1918.

Application filed January 20, 1917. Serial No. 143,454.

*To all whom it may concern:*

Be it known that I, LE ROY B. CARRIS, a citizen of the United States, and a resident of Clay county, Iowa, have invented certain new and useful Improvements in Resilient Wheels, of which the following is a specification.

My invention is an improvement in resilient wheels, and has for its object to provide a tire for taking the place of the pneumatic tire, wherein resilient mechanism is provided within the usual shoe or casing, possessing practically all the advantages of the pneumatic tire, but which will not be lessened in resiliency by puncture or blow out.

In the drawings:

Figure 1 is a side view of a wheel provided with the improved tire, with parts in section, Fig. 2 is a perspective view of a portion of the rim, Fig. 3 is a section on the line 3—3 of Fig. 1 looking in the direction of the arrows adjacent to the line, Fig. 4 is a perspective view of one of the shoes, Fig. 5 is a similar view of a portion of the inner rings showing the joint between the sections, Fig. 6 is a perspective view of one of the holding pins, and Fig. 7 is a perspective view of the demountable rim.

The present embodiment of the invention is shown in connection with a wheel 1 having the usual felly 2, and provided with a quick demountable rim. This rim rests upon a ring 3 fitting the outer face of the felly and having at one edge an oblique flange 4. At the opposite side edge a retaining ring 5 fits against the side of the felly and is retained in place by bolts 6 and nuts 7, the said retaining ring having an inwardly extending rib 8 engaging over the outer face of the ring 3 and the inner face of the rib is inclined as shown, at the same angle as the oblique flange 4. The demountable rim 9 has the usual oblique flanges at its side edges, and the said rim is a split rim, the ends of the rim at the split being connected by a cross plate 10 which is connected to the rim by screws 11. The demountable rim 9 is provided on its under side with circumferentially extending ribs 12 which are adapted to engage the inner faces of the flange 4 and the rib 8, to hold the demountable rim in proper position on the wheel, and at the plate 10 these ribs are cut away as shown in Fig. 2, in order that the inner face of the plate may be flush with the inner face of the ribs.

The shoe or casing 13 is of the clencher type and the side edges are held in place on the demountable rim by retaining rings 14, the said rings being shaped to fit the retaining ribs of the shoe or casing and to engage within the flanges 10 of the demountable rim in the usual manner. Within the casing and at the tread thereof, is arranged a strip 15 of leather, the said strip extending entirely around the tire, and it will be noticed from an inspection of Fig. 3, that the side edges of the strip are beveled.

A series of shoes is arranged within the shoe or casing 13, each of the said shoes comprising a body 16 which is curved transversely to fit the inner face of the strip 15 of leather, and an inwardly extending lug 17 at each end of the body. These lugs have series of slots 18, the said slots being spaced apart from each other as shown, and an opening 19 is provided extending transversely of the slots for receiving a rivet or the like, for a purpose to be described. These shoes 16 are arranged with their ends spaced apart, as shown more particularly in Fig. 1, and they are connected by the links 20, the said links engaging the slots 18 at their ends, and a rivet is passed through the opening 19 and through registering openings in the links to pivotally connect the shoes at their adjacent ends. In the present instance each pair of adjacent shoes is connected by three links, the said links being parallel and spaced apart from each other, as shown.

Each shoe 16 has on its inner face, and adjacent the inner sides of the lug 17, a pair of retaining abutments 21, and a pair of coil springs 22 is arranged between each shoe and the demountable rim, the outer ends of the springs engaging the abutments 21, which properly space the said outer ends and hold them in shape. The inner ends of the springs engage similar abutments 21ª on the demountable rim. A pair of sectional rings is arranged on the demountable rim, the members of the pair being at opposite sides of the shoe or casing 13, and each of the said rings is composed of four sections 22, and the ends of the sections abut as shown in Fig. 5.

The corresponding sections of the rings are connected by the pins 23, shown in Fig. 6, each pin having its ends reduced and oppositely threaded, and the said ends are engaged with threaded openings in the ring sections. Shoulders are formed at the inner ends of the reduced and threaded portions, and these shoulders abutting the inner faces of the sections, limit their movement toward each other. They are further limited by the angle plates 24, which are arranged at the ends of the sections, between corresponding sections of the pair, each angle plate having one portion radial and the other circumferential to the wheel, and the radial portions of the plates abut, as shown. Spacing plates 25 of T-shape are arranged between the sections intermediate the ends thereof, and between the adjacent ends of the shoes 16. The adjacent ends of the sections are connected by the plates 26, the said plates being secured to the abutting ends of the sections in any usual or desired manner, and extending upon each side of the joint for a short distance.

The improved tire is assembled on the demountable rim and then placed on the wheel. The parts are assembled with the demountable rim in the position of Fig. 7, that is with the ends lapping. The sections of the holding rings 22 are assembled, after which the said sections may be placed within the casing. The shoes are first placed, and afterward the springs. The holding ring sections are then placed, and the casing is connected with the rim, the rim being at this time in the position of Fig. 7. After the parts have been so placed, the rim is spread until the ends abut, after which the plate 10 is placed, and the assembled tire may be placed upon the wheel. The springs are held in place during the placing of the rim by the abutments 21ª.

Mechanism is provided for holding the retaining rings 14 in place until the rim 9 is expanded. The said mechanism, as shown in Fig. 3, consists of a series of clamps, each comprising a substantially U-shaped clamp consisting of a body 27, and arms 28 and 29 extending laterally from the body. The arm 28 has an inwardly extending lug 30 which engages one of the rings 14 externally, and a screw 31 is threaded through the other arm to engage the other ring. As soon as the rim is expanded it will hold the rings 14 in place.

I claim:

1. A wheel of the character specified having a rim, a casing, and means for connecting the casing to the rim, cushioning mechanism within the casing and comprising pairs of coil springs arranged radially of the wheel, a shoe for each pair of springs, each shoe being curved to fit the inner face of the casing and having inwardly extending lugs at its ends, a series of links connecting the lugs of each adjacent pair of shoes, said lugs having openings extending circumferentially of the wheel for receiving the ends of the links, and a pair of retaining rings within the casing, said rings being at opposite sides of the springs and each ring being sectional, and the corresponding sections of the rings being connected together in spaced relation.

2. A wheel of the character specified having a rim, a casing, and means for connecting the casing to the rim, cushioning mechanism within the casing and comprising pairs of coil springs arranged radially of the wheel, a shoe for each pair of springs, each shoe being curved to fit the inner face of the casing and having inwardly extending lugs at its ends, links connecting the lugs of adjacent shoes and pivoted to the lugs, and retaining rings at opposite sides of the springs, said rings being connected together in spaced relation and being sectional, for the purpose specified.

3. In a wheel of the character specified, a split rim and a casing, and means for connecting the casing to the rim, pairs of coil springs arranged radially within the casing, a shoe for each pair of springs, each shoe being curved to fit the inner face of the tire casing and having inwardly extending lugs at its ends, links pivotally connecting the lugs of adjacent shoes, and retaining rings at opposite sides of the springs, said rings being connected together in spaced relation.

LE ROY B. CARRIS.

Witnesses:
C. L. CADY,
JAS. M. HOSKINS.

Copies of this patent may be obtained for five cents each, by addressing the "Commissioner of Patents, Washington, D. C."